United States Patent [19]

Neer

[11] Patent Number: 4,569,468

[45] Date of Patent: Feb. 11, 1986

[54] CONTINUOUS FORMS FEED TRACTOR WITH MULTIPLE CUT FORMS CHUTES

[75] Inventor: Jay H. Neer, Boca Raton, Fla.

[73] Assignee: International Business Machines Corporation, Armonk, N.Y.

[21] Appl. No.: 651,567

[22] Filed: Sep. 18, 1984

[51] Int. Cl.[4] .................... G03B 1/30

[52] U.S. Cl. .................... 226/74; 400/616.1

[58] Field of Search .................... 226/74, 75; 271/34, 271/35, 198; 400/616.1, 616.2

[56] References Cited

U.S. PATENT DOCUMENTS

| | | | |
|---|---|---|---|
| 4,226,353 | 10/1980 | Blaskovic et al. | 226/74 |
| 4,453,660 | 6/1984 | Cornell et al. | 226/74 |
| 4,457,463 | 7/1984 | Hubbard et al. | 226/74 |
| 4,471,896 | 9/1984 | Milano, Jr. | 226/74 |

OTHER PUBLICATIONS

IBM Technical Disclosure Bulletin, vol. 23, No. 7B, Dec. 1980 by M. F. Davis, Jr. et al.

*Primary Examiner*—Leonard D. Christian
*Attorney, Agent, or Firm*—Sughrue, Mion, Zinn, Macpeak, and Seas

[57] ABSTRACT

A continuous forms feed tractor in the form of an elongated housing mounts for rotation thereon, an endless belt from which protrude longitudinal spaced aligned pins, projectable within similarly spaced holes along an edge of a continuous forms record medium for positively feeding the continuous forms medium about a rotary platen and between the platen and a print head for implementing printing on the continuous form. The housing is provided with a long cut forms chute running the length of the same, below the endless belt and parallel therewith for feeding letter size or legal size paper sheets onto and about the platen. A short cut forms chute extends obliquely through the elongated housing, at the end facing the platen, inclined downwardly towards the platen and the long cut forms chute for feeding short cut forms, such as a punch card onto and about the platen for printing thereon. Forces are applied on pressure feed rolls to press the cut forms media against the rotating platen driving them around the platen, up past the print mechanism. A door pivotally mounted to the side of the housing for movement between a first, upright position exposing the endless belt and a second position sandwiching the form between the door and the top of the elongated housing, allows access to the short cut forms chute, at the side of the endless belt, when the door is in raised position.

8 Claims, 7 Drawing Figures

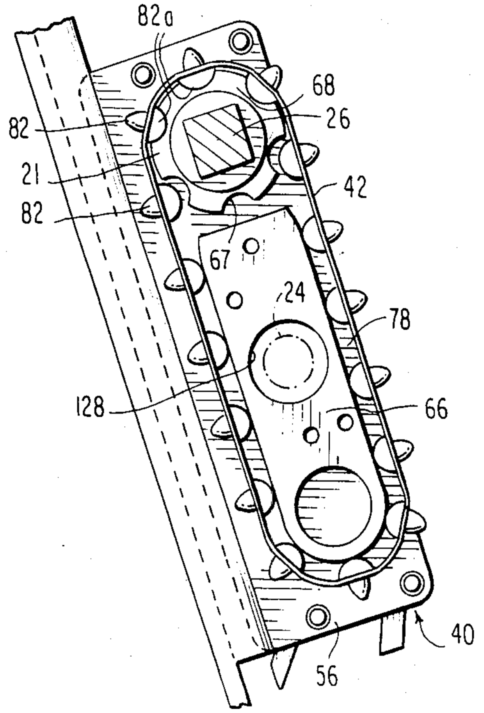
FIG. 5
FIG. 4
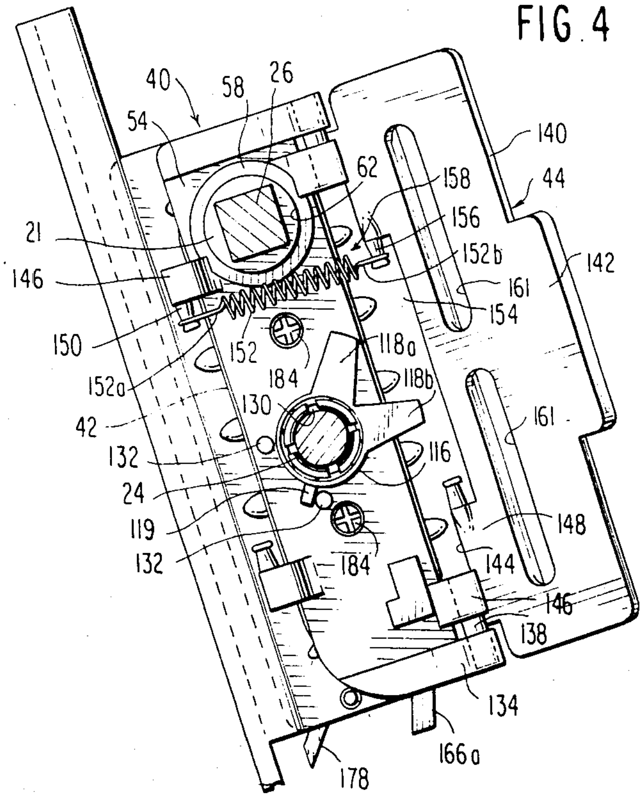

CONTINUOUS FORMS FEED TRACTOR WITH MULTIPLE CUT FORMS CHUTES

FIELD OF THE INVENTION

This invention relates to a continuous forms feed tractor, and more particularly to such forms feed tractor having the capability of facilitating the feed of continuous forms having edge perforations; long forms such as letter-size or legal-size sheets, and short forms such as punch cards, through a printer for printing upon such record media.

BACKGROUND OF THE INVENTION

Forms feed mechanisms function to synchronize movement of a paper sheet, web or the like, through a printer. A pair of laterally spaced, shiftable forms feed tractors are mounted on the forms handling section of a printer so that they can be set in positions determined by the lateral width of the forms being fed, and function to facilitate the movement of paper past a print head. The pair of tractors comprise elongated molded plastic or metal housings, through which projects by way of suitable bushings, a support shaft which extends laterally across the printer. The tractors employ a releasable friction clamp for locking the left and right tractors at laterally spaced positions on the support shaft to define the path of the print medium form being fed through the printer. Further, conventionally, an endless belt is mounted on each of the housings, to its lateral outside within an appropriate track. The endless belt, is provided with semicircular bars on its inner periphery which are received within the valleys between sprocket teeth of a sprocket, mounted for rotation at one end of the elongated housing within the elongated housing, about which the endless belt is engaged. A drive shaft, projects laterally across the printer, through the sprockets and engages both sprockets to drive the endless belts for the left and right tractors respectively from a common drive motor coupled to the drive shaft. Pins projecting outwardly from the endless belt at right angles to the outer surface of the belt enter pre-punched holes on the endless form record media along both sides thereof, and as the pins move, they carry the paper forwardly through the printer.

U.S. Pat. No. 4,226,353, issued Oct. 7, 1980, to Silvio U. Blaskovic et al, and assigned to the common assignee, shows a continuous forms feed tractor of this type. Typically, the front end of the elongated housing (relative to the feed path of the endless forms record media) is in juxtaposition to a rotating, cylindrical platen. The continuous forms record medium contacts the periphery of the platen for rotation therewith, past a confronting print head just upstream of the point where the perforations of the endless forms record media engage the endless belt pins of the forms feed tractors.

To maintain engagement between the continuous forms record medium and the paired endless belts carried respectively by the left and right tractors, each of the tractors have mounted thereto, to the lateral outward side of the endless belt, a door which pivots from a generally upright, forms access position, to a door closed position where the door overlies the endless belt, and functions to sandwich the endless forms record medium, in the area of the perforations, against the top of the elongated housing of the forms feed tractors.

In U.S. Pat. No. 4,226,353, the door is pivotally mounted by means of pivot pins fixed to the door at respective ends and pivotally mounted within snap fit slots of flanged receivers projecting outwardly and upwardly of the elongated housing. Additionally, one or more coil springs are connected between the elongated housing and the pivotable door, at a point above the pivot axis defined by the pins carried by the door. Further, stops are formed on the flanged receivers for ensuring that when the doors are open, they rotate such that the springs pass through the centers of rotation of the door pivot mounting pins, thereby ensuring that the doors are maintained in their upright or raised position under an overcenter action to prevent inadvertent closure.

Such continuous forms feed tractors have operated adequately in feeding continuous forms record media through wire or other type printers, however, there is a current need for such printers to randomly print on other than such continuous forms utilizing edge perforations as positive drive feed of the forms through the printer. Attempts have been made to facilitate the feeding of record media such as letter-size or legal-size paper sheets through the printer. IBM Technical Disclosure Bulletin, Volume 23, No. 7B, of December, 1980 to M. F. Davis, Jr. et al shows a cut-forms guide in the form of a chute 10 mounted to a horizontal front pivot rod of a forms wire rack assembly. This permits the chute to be adjusted to and fixed at an appropriate print position with the left edge of the guide becoming the left side of the paper, thereby assuring consistent forms feed into the pressure roll assembly when loading forms.

In at least one IBM Series/1 4974 commercial printer, a specially formed, molded plastic cut form chute assembly is insertably installed on positioning studs of the printer, after removal of the continuous form tractor assembly, to facilitate the use of cut forms type record media in lieu of the continuous forms type having the perforated edges. While the cut forms chute as a installable unit functions adequately to feed cut forms such as letter-size or legal-size paper of predetermined width, the substitution and replacement of the cut form chute for the continuous form tractor assembly and vice versa is fairly complicated and requires a series of steps to replace one for the other, to the inconvenience of the operator of the printer.

It is therefore a primary object of the present invention to provide an improved continuous forms feed tractor having the capability of handling all of the present forms currently specified for use in a standard continuous forms feed device, plus cut forms such as IBM punch cards, legal-size and letter-size paper sheets and the like without the necessity to add, subtract or substitute components to the printer itself, and without compromising the continuous forms feed mechanism of the printer.

SUMMARY OF THE INVENTION

In a continuous forms feed tractor for feeding a continuous form record medium having edge perforations, through a printer about the periphery of a rotatable cylindrical platen and in front of a print head facing the platen for imprinting the record medium with the continuous forms feed tractor being in juxtaposition to the platen and wherein, said tractor comprises: an elongated housing, including a top and bottom surfaces, a front end and a rear end, said front end facing said platen and being juxtaposed thereto a groove within the top surface of said elongated housing, an endless belt born by said groove, a sprocket rotatably mounted in said housing and engaging said belt for driving said belt, means for rotating said sprocket, a door pivotably mounted to the side of said housing for movement between a first, generally upright, open position exposing said endless belt, and a second, face engaging position with said continuous forms record medium and said housing, pins projecting outwardly of the face of said endless belt and engaging corresponding perforations along the edge of said continuous forms record medium. The improvement comprises at least one feed chute within said housing, having at least a portion extending to the side of said endless belt and extending longitudinally in the direction of said platen. Said at least one feed chute terminates at the end of the platen, upstream of said print head, whereby, cut forms may be fed alternatively to the continuous forms, through said narrow slot onto the periphery of the rotatable platen for imprinting thereon by said print head.

The continuous forms feed tractor may have an elongated long cut forms feed chute extending the length of the housing, parallel to the top and bottom surfaces and opening outwardly at the rear end of the elongated housing to permit ready insertion of the long cut forms therein. A diagonal slot may be formed within said elongated housing defining a short cut forms chute from said top surface of said elongated housing towards said bottom surface, opening through the front end of said elongated housing adjacent to said platen with said diagonal slot being laterally inside of said endless belt. The pivotable door may be of a lateral width such that a portion of the door overlies the entrance to the diagonal slot requiring the pivoting of the door to the first open position to permit short cut form access to the slot for feeding of punch cards or the like. Both the short cut form and long cut form chutes may be integrally molded into the elongated housing of the continuous forms feed tractor, such that the short cut forms chute and the long cut forms chute intersect each other upstream of the platen, and to the side of the platen opposite the print head.

BRIEF DESCRIPTION OF THE DRAWINGS

FIG. 4 is a side elevational view opposite to that of FIG. 2, with door pivoted to record medium access position to allow short cut forms to be fed to the print head.

FIG. 5 is a sectional view of the continuous form feed tractor of FIG. 3 taken about line 5—5.

DESCRIPTION OF THE PREFERRED EMBODIMENT

Figure 1:
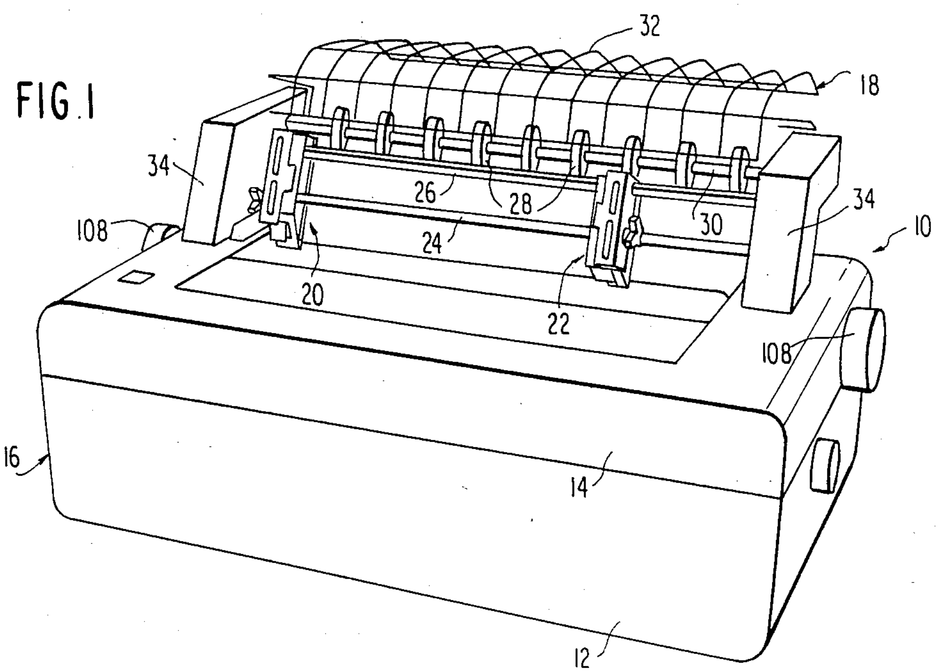
FIG. 1 is a perspective view of a medium speed wire printer utilizing a pair of improved continuous forms feed tractors with multiple cut forms chutes forming a preferred embodiment of the present invention.

Referring to FIG. 1, a medium speed wire type printer is indicated generally at 10, sized for desk top mounting, and is comprised of a base 12, to which is removably mounted, a top cover 14. Base 12 and cover 14 form an essentially rectangular, parallelpiped housing 16 for housing the printer components within the interior of the base 12 and cover 14. Detachably mounted to the rear of top cover 14, and projecting upwardly therefrom, is a continuous form tractor assembly, indicated generally at 18. It is within the continuous forms tractor assembly 18 that the invention resides, particularly with respect to two continuous forms tractors, i.e., a left tractor, indicated generally at 20, and a right tractor, indicated generally at 22. Extending laterally across the tractor assembly 18 are a pair of rods comprising a support shaft 24, of circular cross-section, and a square cross-section continuous forms tractor drive shaft 26. Alternatively, the shaft 26 could have a hexagonal cross-section or be splined. Slidably mounted on the support shaft 24 are left tractor 20 and right tractor 22, which tractors may be selectively shifted in position on the support shaft 24 and frictionally clamped thereto, at laterally adjusted positions. As such, the machine may imprint continuous forms record media of various widths. This is accomplished as in the description of the prior art by the media having edge perforations on one or both edges for feeding through the machine. As illustrated in FIG. 1, to the rear of shafts 24 and 26 are a plurality of continuous forms rollers, as at 28, mounted for rotation about their axes on roller support shaft 30. Additionally, a specially formed wire rack 32 is fixedly mounted to the tractor assembly 18 at opposite ends so as to overlie the rollers 28 and it functions to guide, due to its curvature, the movement of the continuous forms record media leaving the left and right tractors 20, 22, to the rear of the printer 10. As may be appreciated, paired generally inverted L-shaped side arms 34 are mounted to the top cover 14 of the printer and support the left and right tractors 20 and 22, the continuous forms rollers 28 and wire rack 32.

Figure 2:
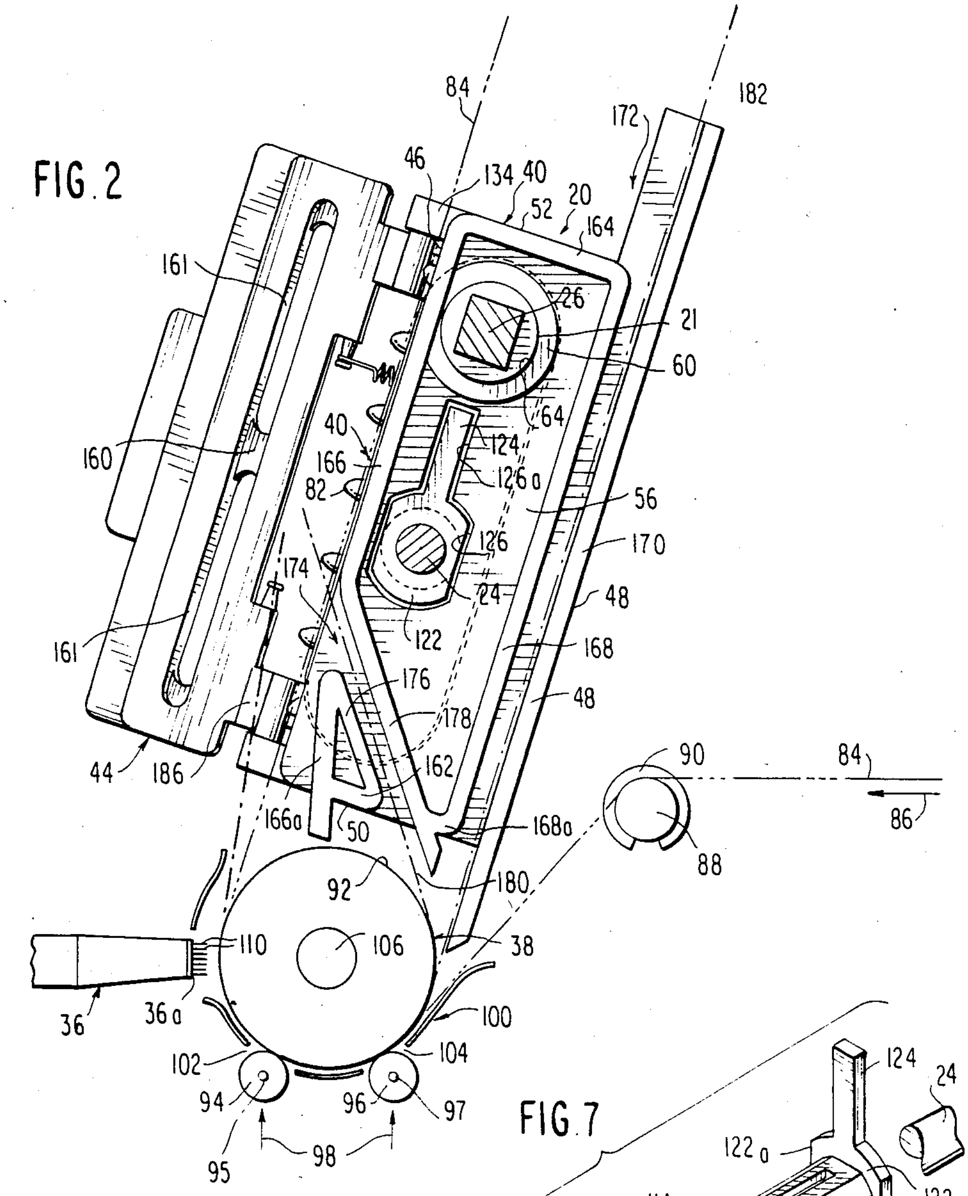
FIG. 2 is side elevational view of a portion of the printer of FIG. 1, illustrating one of the improved continuous forms feed tractors with the basic printing components in juxtaposition thereto.
Figure 7:
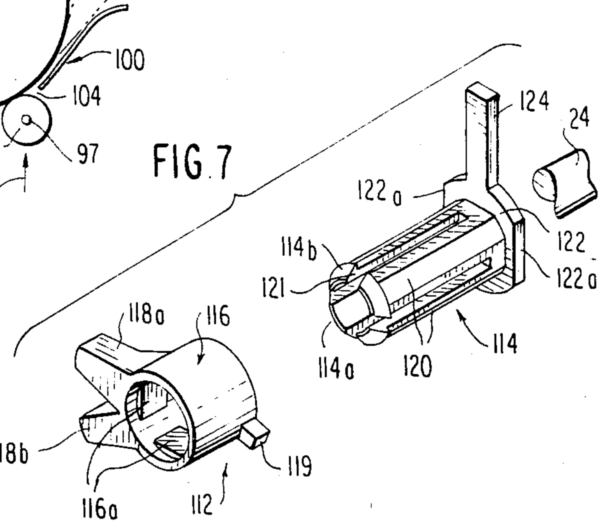
FIG. 7 is an exploded view of the clamp illustrated in FIG. 6.

Referring next to FIG. 2, there is shown in somewhat schematic form, the principal components of the printer 10 including the left tractor 20, which is shown in side elevational form. In that respect, within the printer 10, some of the components are mounted within base 12, and the others within top cover 14. The principal components of the printer comprise a print head indicated generally at 36, an elongated cylindrical platen indicated generally at 38, and the left tractor 20. The left and right tractors comprise an elongated, generally bar-shaped housing indicated generally at 40, which may be formed of molded plastic, and with the exception of the present invention, functions primarily to support for endless movement, an endless belt 42. In conjunction with that function, as a second component of each tractor, there is provided a pivotal door indicated generally at 44 in the manner of prior U.S. Pat. No. 4,226,353.

The details of the forms feed tractors 20, 22 may be readily had by reference to U.S. Pat. No. 4,226,353, and the description herein is limited to the components related to the general use and function of the tractors 20, 22 including the cut forms feed mechanism. Housing 40 is comprised of two sections 74, 76 which are laterally side-by-side joined in the manner of U.S. Pat. No. 4,226,353. Housing 40 is provided with a top surface 46, a bottom surface 48, a front end 50, and a rear or back end 52. It may be of molded plastic form and has laterally spaced side walls at 54, 56. Side wall 54 is the outside side wall of housing 40 within section 74 and side wall 56 is inside thereof as part of section 76, facing tractor 22. Tractor 22 is identically formed, as a mirror image, of tractor 20.

In accordance with U.S. Pat. No. 4,226,353, the side walls 54, 56 are provided with the appropriate bushings as at 58, 60, bearing holes as at 62 and 64 respectively. Mounted within the holes 62, 64 and sandwiched between outer side wall 54 and inner side wall 56 is sprocket 21, having a square cross-sectional bore through which extends drive shaft 26, configured and sized thereto, such that drive shaft 26 drives sprocket 21. The sprocket 21 is mounted internally of the housing 40, that is between side wall 54 and side wall 56. Additionally, inner housing section 76 is formed with an elongated D-shaped projection 66, FIG. 5, to form a track 78 within housing 40 sized to endless belt 42. Belt 42 mounts to the housing 40 by separating lateral sections 74, 76 of the housing 40, with the belt being slipped onto a pre-formed track 78 and about sprocket 21. Structurally, this is identical to U.S. Pat. No. 4,226,353.

The sprocket 21, which is of cylindrical or disc form, includes a plurality of sprocket teeth 68 on the periphery forming semi-circular grooves or valleys 67 between the teeth. The endless belt 42 includes a plurality of transversely extending bars 82*a* of corresponding semi-circular cross-section spaced along the bottom of the belt which may in fact be integral extensions of pins 82, projecting outwardly of the endless belt 42. As such, the endless belt is driven by a drive shaft 26. Further, the endless belt 42, which may be a strip of non-stretchable polyimide film such as Kapton, is sized laterally, slightly narrower than the width of the track 78 bearing the same, so that, the projecting pins 82 project through perforations of corresponding size within the continuous forms record medium 84 to drive the continuous forms record medium 84 through the printer over and across the continuous forms rollers 28, after leaving left and right tractors 20, 22, in the manner of U.S. Pat. No. 4,226,353.

In FIG. 2, it may be seen that the continuous forms record medium 84 is supplied from a source (not shown) as evidenced by arrow 86, such that the continuous forms record medium 84 pass over a horizontal alignment rod 88, between enlarged flanges or ends as 90. The continuous forms record medium 84 moves into contact with the periphery 92 of platen 38, and is pulled around the platen by the fact that the holes in the edge perforations are engaged in the tractor drive pins 82. A plurality of sets of axially spaced pressure feed rolls 94, 96, rotatable about their axes on roller shafts 95, 97, respectively, extend laterally parallel to the bottom of the platen 38, and are pressed against the platen 38 by means such as springs under compression forces, as indicated schematically by arrows 98, such that the peripheries of pressure feed rolls press against the lower side of the cut forms during conditions in which a cut form is fed through the printer 10. A curved paper deflector indicated generally at 100, extends beneath platen 38, and is fixed within base 12. The paper deflector 100 has two sets of cut-outs or windows, at at 102 and 104, located intermittently along the length of the same through which, the pressure rolls 94, 96 pass under applied pressure 98. When continuous forms 84 record medium is being fed through the printer, then the pressure feed rolls 94, 96 are disengaged and moved downwardly and away from the periphery 92 of platen 38 by means (not shown). The platen 38 may be mounted for rotation about its axis by way of platen support shaft 106 which shaft 106 is mounted for rotation upon base 12, with the shaft ends projecting through and beyond the ends of cover 14. Typically, platen knobs as at 108, FIG. 1, are fixed to the platen support shaft 106 at opposed ends to permit the platen to be manually rotated, as desired.

The print head 36 is being shown mounted within base 12, physically oriented in a horizontal position having end 36*a* facing the side of platen 38. The print head bears a plurality of print wires in a matrix fashion, as indicated at 110, for selected wire projection towards and away from any of the record media passing across the end face 36*a* of the same, borne by the rotating platen 38, i.e., such as a continuous forms record medium 84.

To permit laterally sliding movement of the left and right tractors 20, 22 towards and away from each other for adjusting the lateral gap therebetween to accommodate to the width of the continuous forms record medium, or in the case of the instant invention, to adapt the left and right tractors to the lateral width of either short or long cut forms to be fed through the printer 10, each of the tractors 20, 22 include a pivotable clamp indicated generally at 112, mounted to the outer and inner side walls 54, 56 of the elongated housing 40, and which slidably receives the support shaft 24 of circular cross-section. Clamp 112 consists of inner sleeve 114 concentrically surrounding shaft 24, which in turn concentrically supports outer sleeve 116. Unlike U.S. Pat. No. 4,226,353, in which the clutch or clamp 60 comprises a threaded adjusting screw to draw a lower arm upwardly towards an upper arm, thereby reducing the diameter of the hole internally and to clamp about the rotary shaft projecting therethrough, the clamp 112 of the present invention has outer rotatable sleeve 116 carrying integral, radially projecting double actuating handles 118*a* and 118*b*.

Outer sleeve 116 includes four flats or cams 116*a* in circumferentially spaced positions within the inner periphery of the outer sleeve 116. Inner sleeve 114 includes four edge flanged flexible fingers 120 defined by a pair of right angle slots 121 extending partially over the length of the inner sleeve from its tip end 114*a* inwardly. Further, the tip ends include slight radially enlarged flanges 114*b* which abut the ends of the flats or cams 116*a* of the outer sleeve 116. The inner sleeve 114, at its end, includes a radially enlarged flange 122 having flats 122*a* on diametrically opposed sides, and is further provided with a radially projecting arm or stop 124 integral therewith.

Within the inside side wall 56 of the housing inner section 76, on the side remote from housing outer section 74, there is provided a recess 126 which is configured to and slightly over-sized relative to flange 122 of the inner sleeve 114, and which includes a radially projecting recess portion 126*a*, which receives the radially projecting stop 124 of flange 122. As such, the inner sleeve 114 is inserted within a hole 128 of D-shaped projection 66, FIG. 5, and arm 124 is loosely received within recess portions 126*a*. The inner sleeve has a circular bore 130, FIG. 4, through which the support shaft 24 passes. By rotation of the handle 118 of the outer sleeve 116, approximately 45°, the cams or flats 116*a* move into contact with the rounded outer peripheries of the fingers 120 to compress the fingers tightly against the shaft 24, and thus, securely frictionally lock the tractors 20, 22 at given longitudinal positions on the support shaft 24.

To the side of sleeve 116, opposite handles 118*a* and 118*b* and projecting radially outwardly therefrom, diametrically to double handles 118*a* and 118*b*, is a pin 119, and projecting longitudinally outwardly of side wall 54 of housing 40 are a pair of stops 132, circumferentially spaced approximately 45°. The double handle allows for a push lock and push unlock operation of the clamp. The stops 132 limit rotation of the outer sleeve 116 between positions where the clamp 110 is engaged and disengaged with shaft 24. This functions to frictionally lock the left and right tractors, 20, 22, at selectable positions along the length of support shaft 24.

Figure 3:
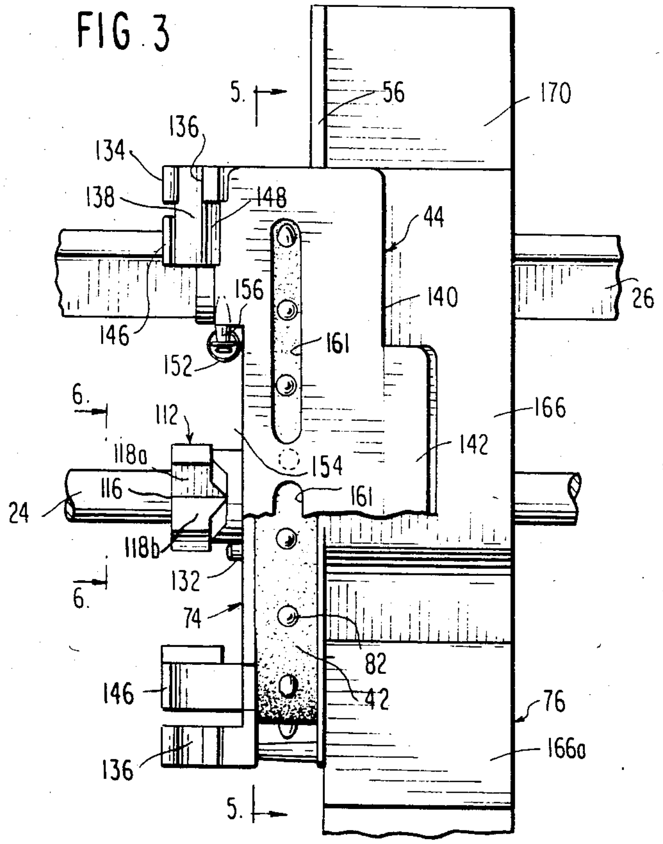
FIG. 3 is a top plan view partially broken away, of the improved continuous forms feed tractor illustrated in FIG. 2.
Figure 6:
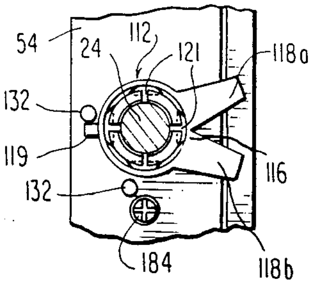
FIG. 6 is a sectional view of the continuous form feed tractor of FIG. 3, taken about line 6—6, showing the clamp for selectively clamping the tractor to its support shaft.

Pivotable door 44 is pivotally mounted to elongated housing 40 and spring biased much in the manner of U.S. Pat. No. 4,226,353. In that respect, the housing outer section side wall 54, is provided at opposite ends with integral flanged pin receivers 134, which in the case of this embodiment, are identical, and have upwardly facing snap fit arcuate slots 136, FIG. 3. The slots 136 form pivot mounts for unitary pivot pins 138 of the door 44, which pins 138 project outwardly at opposite ends 140 and 142 of door 44. The pins 138 are spaced from the lower edge 144 of the door 44, so as to permit the door to pivot relative to pin receivers 134. Additionally, adjacent to each receiver 134 is a vertical stop 146 at each end of the housing section 74 integral with the flanged receiver 134. The stops 146, at their upper ends, contact legs 148, which depend from the lower edge 144 of door 44 and integrally carry the laterally extending pivot pins 138 for door 44. At the center of upper edge 140 of door 44, there exists an inclined lift tab 142 which permits manual pivoting and lifting of the door 44 from its generally horizontal position to a door open, beyond vertical, position. Further, integrally formed and projecting outwardly of outer side wall 54 of the housing 40 for each of the tractors 20, 22, is a coil spring mount 146 of L-shaped form terminating in a tapered, headed pin 150, about which, one end 152*a* of a coil tension spring 152 engages, the coil spring end being held on the pin 150 by its headed end 150*a*. In like fashion, the door 44 includes a central cut-out or recess 154 within lower edge 144, and projecting laterally within the recess from opposite ends are similarly tapered, headed pins, as at 156, about one of which is wrapped the other end 152*b* of the tension coil spring 152. Two coil springs 152 may be employed, if desired. The locations of the L-shaped spring mount 146 and the headed pin 156 on door 44 are such that, during pivoting of the door 44 from either open position to closed position, or vice versa, the spring 152 crosses over and through the pivot axis for the door as defined by pivot pins 138, thus these elements function as an over center spring mechanism 158 for maintaining the door 44 in closed position when closed, or in open position when open, and causing legs 148 of the door, to contact stops 146 when in door-raised and door-open position.

In accordance with the prior U.S. Pat. No. 4,226,353, the door is provided with an elongated groove 160 on its lower face 44*a* opening to a pair of slots, as at 161, which slots extend through the door. Endless belt pins 82 pass through the perforations at the edges of the continuous forms record medium 84 and are received within groove 160 to carry the continuous forms record medium 84 across the top surface 46 of the elongated housing 40 for each of the tractors 20, 22, sandwiched between the door and that housing surface.

The present invention is directed to the modification of the elongated housing 40 of each tractor 20, 22, so as to accommodate and facilitate the feed of both relatively long cut forms, such as letter-size or legal-size stationary paper sheets, and short cut forms such as punch cards or the like. Inner housing section 76 is molded or otherwise formed such that an elongated hollow rectangular box type structure FIG. 2, is formed inwardly of side wall 56 including end walls 162, 164 and flat top and bottom walls 166, 168, respectively. Side wall 56 extends below bottom wall 168 and supports at right angles thereto, an integral rear chute wall 170, parallel to bottom wall 168 but spaced slightly therefrom. In that respect, side wall 56 of the inner housing section 76, flat bottom wall 168 and rear chute wall 170 which extends parallel to wall 168, form a long cut forms or rear chute 172 which is parallel to the top surface 46 of elongated housing 40. Essentially, housing section 76 is in the form of a rectangular box, having a planar wall 170 underlying, but spaced slightly from the bottom wall 168 of that box.

In addition thereto, it should be noted that to the rear, side wall 56 of housing section 76 extends longitudinally beyond rear end 52 of the elongated housing 40, and rear chute wall 170 also extends some distance beyond that of rear end 52. This forms a mouth which facilitates the insertion and feed of the long cut forms into chute 172 and hence to the print area as defined by platen 38 and print head 36.

In addition to the long cut forms chute 172, the inner section 76 of housing 40 is provided with a short cut forms chute indicated generally at 174, which extends diagonally downwardly from the top surface 46 of housing section 76 in the direction of the bottom surface 48 of that member. Further, it opens to front end 50 of the housing 40 of each tractor, and is formed by spaced, co-planar, integral upper and lower inclined walls, as at 176, 178, respectively. Inclined lower wall 178 terminates some distance beyond the end 168*a* of bottom wall 168, the purpose of which is to feed short cut forms record media, such as a punch card 180 into the printing area as a further alternative to feeding the long cut forms record media such as legal-size or letter-size stationary sheets 182.

As may be appreciated, in addition, forward of short cut forms chute 174, the top wall 166 of the housing inner section 76 also inclines downwardly at 166*a* in the direction of the platen 38 to facilitate the movement of continuous forms record media, after printing, up and out of the area under engagement, at each side thereof, by the pins 82 projecting outwardly of endless belts 42.

With respect to each of the tractors 20, 22 which are mirror images of each other, there are some differences between the structure of these tractors and the content of U.S. Pat. No. 4,226,353 other than in terms of the incorporation of integral chutes for feeding larger length cut forms record media 182, such as letter-size and legal-size stationary, and much shorter cut forms record media 180 such as punch cards. While each of the housings 40 is formed of a laterally outer section 74, screw mounted to a inner housing section 76 by screws 184, FIG. 4, two differences exist, the first in the clamping mechanism for effecting clamping of the tractor and fixed at a laterally spaced position along support shaft 24, and secondly, the nature in which the endless belt 42 is carried within the housing 40 at the end opposite that bearing sprocket 66.

In U.S. Pat. No. 4,226,353, the section of the elongated housing bearing the endless belt, incorporates a spring loaded tensioner, in the shape of the letter D, which is spring biased so as to move longitudinally towards and away from an integrally molded projection on the side of that section, intermediate of the tensioner and the sprocket, about which projection the endless belt rides. The tensioner is eliminated in the left and right tractors 20, 22 of the present invention. Instead, the projection on the face of the inner section 76 of the housing 40, is unitary and fixed, and the element can be described as constituting a very elongated D configuration, which is rigid and integral with the molded section 76 itself. It functions therefore, as a purely static guide for the endless belt 42, and performs no tensioning of that belt. Adjacent to the vertical end face of projection 66 is the sprocket 21, identical in configuration and mounting to that of U.S. Pat. No. 4,226,353.

As may be appreciated in accordance with U.S. Pat. No. 4,226,353, each of the parts described herein, with the exception of belt 24, spring 26 and the screws 184, may be constructed of a molded fiberglass reinforced polycarbonate. In operation, the continuous forms record medium feeds in the manner of U.S. Pat. No. 4,226,353. The pressure feed rolls 94, 96 are disengaged from platen 38. Absent the feed and printing on that medium, the pressure feed rolls 94, 96, are engaged, permitting the movement of either short or long cut against the platen forms record media, as at 180, 182, respectively, through chutes 174, 172, respectively, for movement between feed rolls 94, 96, and the platen 38, and about the periphery of the platen in a position facing print head 36 for printing thereon, and then, outwardly therefrom, through a cut forms output path, as indicated generally at 186, FIG. 2, which is different from the continuous forms record medium output path, as defined by housings 40 and door 44 of left and right tractors 20, 22, respectively.

While the invention is particularly shown and described with reference to a preferred embodiment thereof, it will be understood by those skilled in the art, that various changes and formal details may be made therein, without departing from the spirit and scope of the invention.

I claim:

1. In a continuous forms feed tractor for feeding a continuous form record medium, having edge perforations, through a printer, about the periphery of a rotatable cylindrical platen and in front of a print head facing the platen for imprinting the record medium, said continuous forms feed tractor being in juxtaposition to the platen, and wherein, said tractor comprises: an elongated housing including top and bottom surfaces, a front end and a rear end, said front end facing said platen and being spaced slightly therefrom, means within said elongated housing defining a track, an endless belt born by said track, a sprocket rotatably mounted in said housing and engaging said belt for driving said belt, means for rotating said sprocket, a door pivotally mounted to the side of said housing for movement between a first generally upright, open position, exposing said endless belt, and a second, face engaging position with said continuous forms record medium and said housing, pins projecting outwardly of the face of said endless belt engaging corresponding perforations along the edge of the continuous forms record medium to move said continuous forms record medium, the improvement comprising:

at least one feed chute within said housing, at least a portion of said feed chute lying to the side of said endless belt with said feed chute extending in the direction of the platen and terminating at the end of said housing adjacent said platen, upstream of said print head, whereby cut forms record media may be fed alternately through said at least one feed chute to the continuous forms record medium, onto the periphery of the rotatable platen for imprinting thereon by said print head.

2. The continuous forms feed tractor as claimed in claim 1, wherein said at least one feed chute comprises a long cut forms feed chute within said housing extending the length of the housing, parallel to the top and bottom surfaces and opening outwardly at the rear end of the housing to facilitate insertion of long cut forms therein.

3. The continuous forms feed tractor as claimed in claim 1, wherein said at least one feed chute within said housing comprises a diagonal short cut forms chute within said elongated housing from the top surface towards said bottom surface in the direction of said platen and having a lower end opening at the front end of said elongated housing adjacent said platen, and wherein said diagonal short cut forms chute is laterally to the side of said endless belt.

4. The continuous forms feed tractor as claimed in claim 2, wherein said at least one feed chute further comprises a diagonal short cut forms chute formed within said elongated housing from said top surface towards said bottom surface and having a lower end opening to the front end of said elongated housing adjacent said platen, and wherein said diagonal short cut forms chute is laterally to one side of said endless belt.

5. The continuous forms feed tractor as claimed in claim 3, further comprising a spring biased, pivotable door mounted to said housing along the side of said housing remote from said diagonal short cut forms chute and to the opposite side of said endless belt from said short cut forms chute, and wherein, said door is of a lateral width such that a portion of the door overlies the entrance of the diagonal short cut forms chute when in closed position, requiring pivoting of the door to a substantially upright, open position to permit insertion of short cut forms within said diagonal short cut forms chute.

6. The continuous forms feed tractor as claimed in claim 3 wherein said housing comprises an elongated, hollow, rectangular box-type structure comprising spaced top and bottom walls, opposite end walls joining said top and bottom walls, a side wall integral with said top and bottom walls and said end walls, spanning between said walls and extending below the bottom wall, and having integrally formed therewith, at right angles thereto, an integral long cut forms rear chute wall, said long cut forms rear chute wall being parallel to the bottom wall but spaced slightly therefrom to partially define said long cut forms chute, and wherein, the box-type structure further includes co-planar, upper and lower, integral inclined walls opening to the top surface of the top wall and extending diagonally downwardly from the top wall in the direction of the bottom wall and opening to the front end of the housing adjacent said rotable platen, and defining said short cut forms chute.

7. The continuous forms feed tractor as claimed in claim 6, wherein said lower inclined wall extends beyond the end wall proximate to said rotatable platen to ensure engagement between the short cut forms record media and said platen upstream of said print head.

8. The continuous forms feed tractor as claimed in claim 6, wherein the side wall of said housing, remote from the rotatable platen, extends longitudinally beyond the end wall of said housing at that end, and wherein, said long cut forms rear chute wall extends longitudinally beyond that end wall of said housing to a similar extent and is integral therewith to define a long cut forms chute insertion mouth to facilitate insertion and feed of long cut forms record media through said chute to the print area defined by the platen and print head.

* * * * *